United States Patent
Rozanek et al.

(10) Patent No.: US 11,325,450 B2
(45) Date of Patent: May 10, 2022

(54) BAGGAGE DOOR

(71) Applicant: Consolidated Metco, Inc., Vancouver, WA (US)

(72) Inventors: Joseph Rozanek, West Linn, OR (US); Christopher Davis, Boring, OR (US); Kyle Larsen, Vancouver, WA (US); Stephen McGarry, Vancouver, WA (US)

(73) Assignee: Consolidated Metco, Inc., Vancouver, WA (US)

( * ) Notice: Subject to any disclaimer, the term of this patent is extended or adjusted under 35 U.S.C. 154(b) by 9 days.

(21) Appl. No.: 16/828,245

(22) Filed: Mar. 24, 2020

(65) Prior Publication Data

US 2020/0307362 A1 Oct. 1, 2020

Related U.S. Application Data

(60) Provisional application No. 62/823,142, filed on Mar. 25, 2019.

(51) Int. Cl.
*B60J 5/04* (2006.01)
*B62D 65/06* (2006.01)

(52) U.S. Cl.
CPC .......... *B60J 5/0491* (2013.01); *B60J 5/0415* (2013.01); *B60J 5/0431* (2013.01); *B60J 5/0481* (2013.01); *B62D 65/06* (2013.01)

(58) Field of Classification Search
CPC ...... B60J 5/0491; B60J 5/0498; B60J 5/0497; B60J 5/0468; B60J 5/0469; B60J 5/0488
USPC .......................................... 296/146.6, 97.22
See application file for complete search history.

(56) References Cited

U.S. PATENT DOCUMENTS

| | | | | |
|---|---|---|---|---|
| 4,445,623 A * | 5/1984 | Kolling | ................... | B29C 41/04 |
| | | | | 220/844 |
| 5,564,586 A * | 10/1996 | Goodwin | .............. | B65F 1/1646 |
| | | | | 220/844 |
| 6,079,766 A * | 6/2000 | Butler | ................... | B60J 5/0441 |
| | | | | 296/146.5 |
| 2006/0097536 A1* | 5/2006 | DePue | ...................... | B60R 7/04 |
| | | | | 296/37.8 |
| 2007/0228603 A1 | 10/2007 | White | | |
| 2010/0000180 A1* | 1/2010 | Uto | ....................... | E02F 9/0891 |
| | | | | 52/784.1 |

(Continued)

FOREIGN PATENT DOCUMENTS

DE 102011116802 A1 5/2012
EP 1403110 A1 3/2004

OTHER PUBLICATIONS

PCT Search Report and Written Opinion from International Application No. PCT/US2020/024491 dated Jun. 19, 2020; 10 pages.

*Primary Examiner* — Jason S Morrow
*Assistant Examiner* — Kevin P Weldon
(74) *Attorney, Agent, or Firm* — Fitch, Even, Tabin & Flannery LLP

(57) ABSTRACT

In one aspect, a baggage door is provided for a vehicle. The baggage door includes a plastic outer panel for closing an opening of a vehicle and a hinge base configured to be mounted to a surface adjacent the opening. The baggage door further includes a plastic inner support having a hinge portion of the plastic inner support configured to pivotally connect to the hinge base. The inner support includes an arm portion extending away from the hinge portion for supporting the outer panel.

23 Claims, 16 Drawing Sheets

(56) References Cited

U.S. PATENT DOCUMENTS

| | | | |
|---|---|---|---|
| 2010/0090485 A1* | 4/2010 | Cho | B60N 2/793 296/1.09 |
| 2011/0025087 A1 | 2/2011 | Ramos | |
| 2016/0311317 A1 | 10/2016 | Stack | |
| 2019/0375369 A1* | 12/2019 | Hufen | B60R 21/38 |

* cited by examiner

BAGGAGE DOOR

CROSS-REFERENCE TO RELATED APPLICATION

This application claims the benefit of U.S. Provisional Application No. 62/823,142, filed Mar. 25, 2019, which is hereby incorporated herein by reference in its entirety.

FIELD

This disclosure relates to vehicles and, more specifically, to a baggage door for a vehicle.

BACKGROUND

Baggage doors are often used on commercial vehicles, such as semi-trucks, to permit a driver to transfer baggage or other objects into or out of a cab of the vehicle. Baggage doors typically include a large outer panel, such as around two and a half feet wide by one foot tall, for closing a large through opening in the body of the vehicle. The body through opening is sized to permit an operator of the vehicle to transfer objects, such as luggage, from outside of the vehicle into the cab of the vehicle. Baggage doors also typically include a hinge for connecting the outer panel to the body near the through opening. The hinge permits the outer panel to pivot from a closed position wherein the panel closes the body through opening and is flush with adjacent portions of the body and an open position wherein the outer panel is moved away from the body through opening and out of the way of the user.

The outer panel of a traditional baggage door is a laminate including a base sheet of metal that provides rigidity for the outer panel and an outer sheet of metal crimped around a periphery of the outer sheet to the base sheet. The outer sheet of metal is class A sheet metal that may be primed and painted to resemble surrounding portions of the body of the commercial vehicle. The large base sheet and outer sheet used to form the outer panel are relatively heavy which increases the overall weight of the commercial vehicle. As the weight of a commercial vehicle increases, the fuel efficiency of the vehicle generally decreases.

The hinge of a traditional baggage door includes a base for being mounted to the body near the body through opening and an arm that is pivotally connected to the base. The outer panel is mounted to the arm such that pivoting of the arm relative to the base produces pivoting of the outer panel mounted to the arm. As noted above, the outer panel is relatively large and heavy. Further, baggage doors are often required to withstand a predetermined load applied to the outer panel when the outer panel is in the open position. For example, if an operator of the vehicle were to slip near the vehicle and attempt to catch himself by grabbing the open outer panel. The operator's weight would load the baggage door in a manner similar to a cantilevered beam and imparts high stresses at the hinge.

The base and arm of traditional baggage doors are made of stamped metal to provide the strength to support the weight of the outer panel and resist loads applied to the outer panel when the outer panel is in the open position. The weight of the metallic hinge components increases the overall weight of the commercial vehicle. Further, the properties of the sheet metal used to form the components of the hinge may vary during production due to variation in sheet metal from different suppliers or from the same supplier. These changing properties may result in changing tolerances of hinges during a production run and associated variation in the fit and finish of traditional baggage doors that utilize the hinges.

SUMMARY

In accordance with one aspect of the present disclosure, a baggage door is provided for a vehicle. The baggage door includes a plastic outer panel for closing an opening of a body of a vehicle and a hinge base configured to be mounted to the vehicle body adjacent the opening. The baggage door further includes a plastic inner support having a hinge portion configured to pivotally connect to the hinge base. The inner support includes an arm portion extending away from the hinge portion for supporting the outer panel. The plastic outer panel provides a significant weight savings for the vehicle when compared to a traditional metal outer panel having an outer metal sheet crimped to a base metal sheet. The plastic inner support further reduces the weight of the baggage door while being configured to support the weight of the plastic outer panel and resist loading applied to the plastic outer panel, such as if an operator were to pull downward on the plastic outer panel. The reduced weight of the plastic outer panel and plastic inner support may improve the fuel economy of the vehicle.

In one embodiment, the plastic inner support includes elongate strengthening ribs extending longitudinally and the hinge portion of the inner support includes knuckles laterally offset from the elongate strengthening ribs. The lateral offset of the strengthening ribs from the knuckles may position each knuckle between a pair of strengthening ribs so that the pair of strengthening ribs operate together to transfer loading from the arm portion of the inner support to the knuckle, which more evenly distributes loading throughout the plastic inner support.

In accordance with another aspect of the present disclosure, a vehicle is provided that includes a plurality of wheels, a body connected to the wheels, and a through opening of the body. The vehicle further includes a baggage door having a plastic outer panel for closing the through opening of the body and a hinge base configured to be mounted to the body adjacent the opening. The baggage door further includes a plastic inner support and a hinge portion of the plastic inner support configured to pivotally connect to the hinge base. The plastic inner support includes an arm portion extending away from the hinge portion for supporting the outer panel. The plastic outer panel provides a durable closure for the vehicle body through opening and resists corrosion from salt, water, and other environmental factors. The plastic outer panel and the plastic inner support also dampen vibration, such as vibrations caused by the road or a generator near the baggage door, when compared to traditional metal baggage doors.

The present disclosure also provides a method of assembling a vehicle baggage door. The method includes mounting a plastic hinge base to a body of the vehicle adjacent a through opening of the body. The method includes lacing knuckles of a plastic inner support with knuckles of the plastic hinge base and advancing a metallic hinge pin through openings of the laced knuckles to pivotally connect the plastic inner support and the plastic hinge base. The method further includes mounting a plastic outer panel to the inner support. The method permits the plastic outer panel to be readily and securely positioned to selectively close the through opening of the vehicle body.

DETAILED DESCRIPTION

Figure 1:
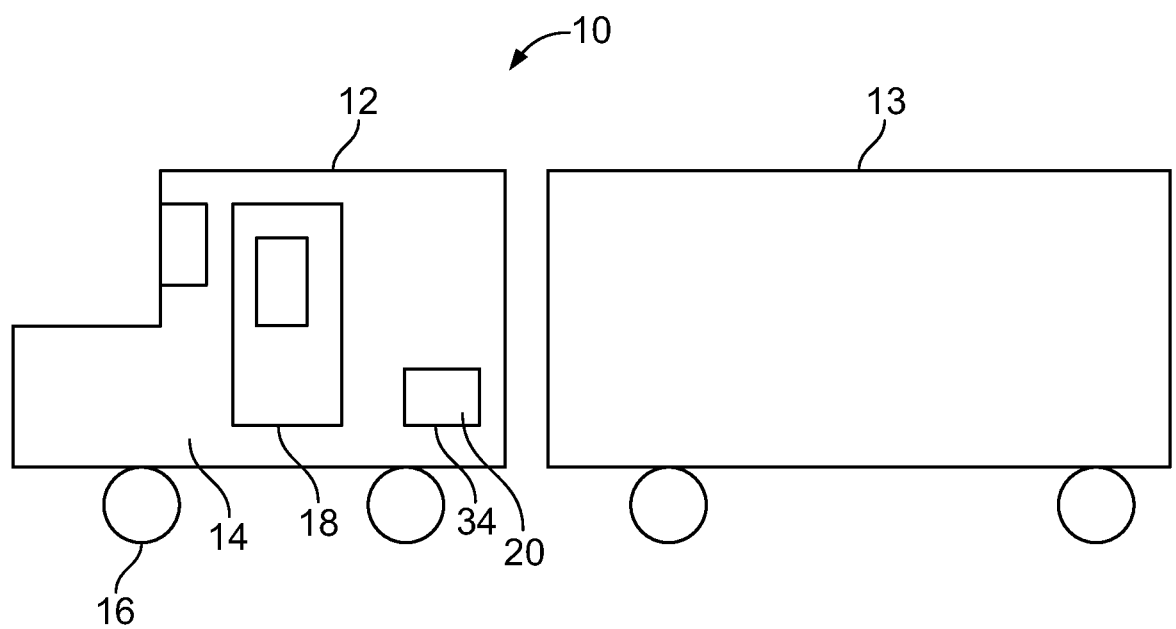
FIG. 1 is a schematic view of a commercial vehicle including a baggage door.

With reference to FIG. 1, a commercial vehicle, such as a tractor-trailer 10, is provided that includes a truck 12 connected to a trailer 13. The truck 12 includes a body 14 supported on wheels 16 and having a door 18. The door 18 may be opened to access an interior of the body 14. The truck 12 also includes a baggage door 20 that selectively closes an opening 34 of the body 14 and permits access to the interior of the body 14.

Figure 2:
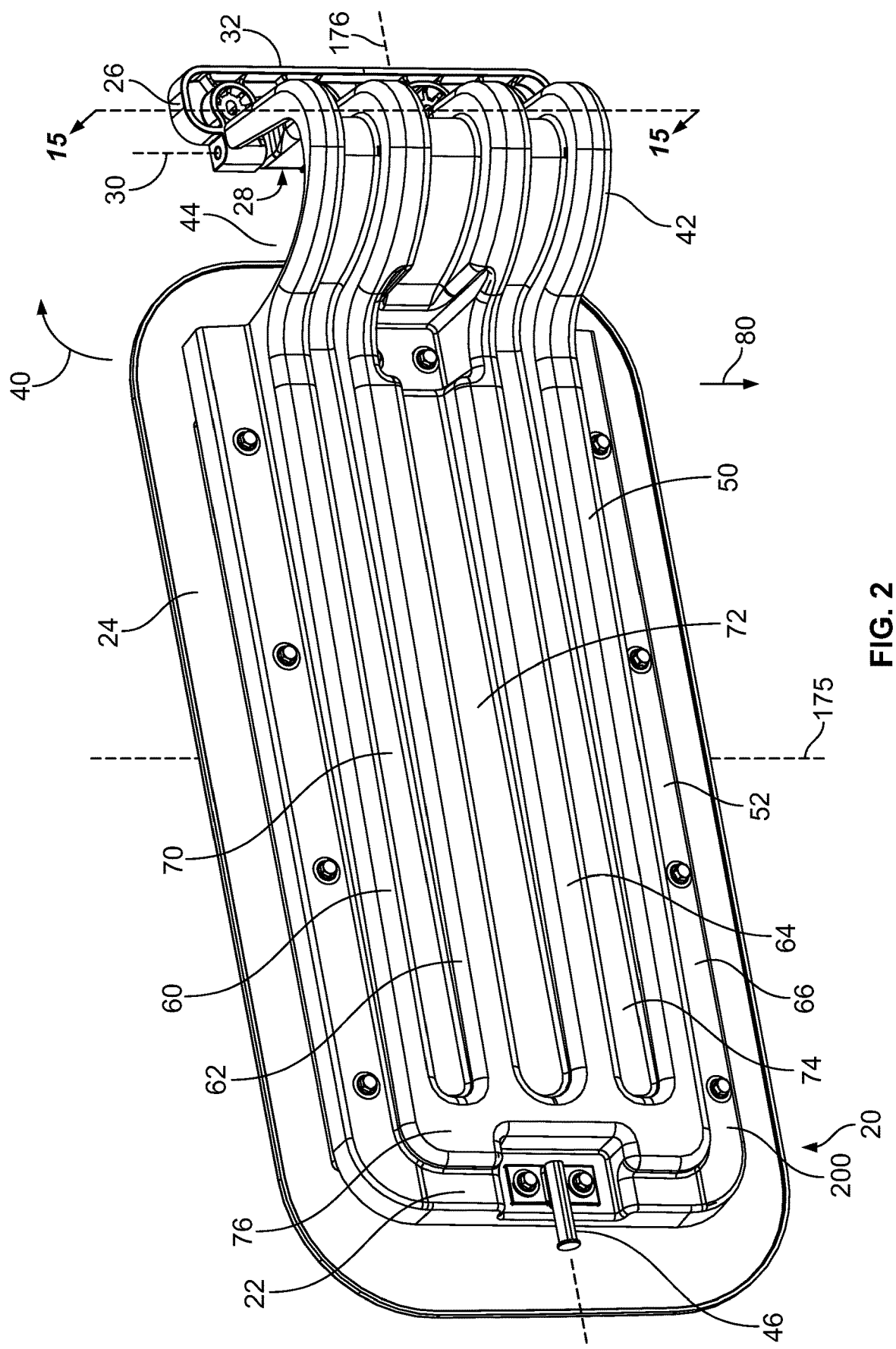
FIG. 2 is a perspective view of the baggage door of FIG. 1.

With respect to FIG. 2, the baggage door 20 is shown from an interior perspective. The baggage door 20 includes an outer panel 24 and a hinge, such as an inner support 22 and a hinge base 26. The outer panel 24 is mounted to the inner support 22 and the inner support 22 includes a hinge portion 28 that cooperates with the hinge base 26 and a hinge pin 148 (see FIG. 3) to define an axis 30 about which the inner support 22 and outer panel 24 mounted thereto may pivot between open and closed positions.

One or more of the components of the baggage door 20 are made of a non-metallic, such as plastic, material. For example, the inner support 22, outer panel 24, and hinge base 26 may be made of a plastic material that provides a reduced weight compared to traditional metal baggage doors while providing sufficient strength to withstand loads placed on the outer panel 24 when the outer panel 24 is in the open position. In one embodiment, the inner support 22, outer panel 24, and hinge base 26 are all made of one or more plastic materials. For example, the inner support 22 may be made of a glass filled polymer, the outer panel 24 is made of a polymer suitable for cosmetic applications, and the hinge base 26 may be formed from a glass-filled polymer. The material of the outer panel 24 is selected to provide sufficient rigidity for the outer panel 24 to compress a dust seal of the vehicle body 14 that extends about the opening 34. Further, the plastic materials of the inner support 22, outer support 24, and hinge base 26 reduce the weight of the baggage door 20, resist corrosion, and dampen vibration during operation of the tractor-trailer 10.

By making the inner support 22, outer support 24, and hinge base 26 out of plastic material(s), the tolerances of the baggage door during manufacture may be improved because the components are not formed from stamped sheet metal. As one example, the inner support 22, outer panel 24, and hinge base 26 may be formed by injection molding plastic material which permits close tolerances to be maintained throughout a production run. The inner support 22, outer panel 24, and hinge base 26 may each have a unitary, one-piece construction. In other approaches, the inner support 22, outer panel 24, and hinge base 26 may be formed using blow molding or additive manufacturing.

Regarding FIG. 2, the hinge base 26 includes an inner surface 32 that is mounted to a surface of the body 14 near the opening 34. The inner support 22 and outer panel 24 mounted thereto are shown in FIG. 2 in the closed position relative to the hinge base 26. The inner support 22 and outer panel 24 mounted thereto may pivot outward in direction 40 to the open position around the axis 30. The inner support 22 includes a gooseneck portion 42 forming a recess 44 that receives a portion of the body 14 near the opening 34 and provides clearance for the inner support 22 as the inner support 22 pivots from the closed position to the open position. The baggage door 20 further includes a striker 46 mounted to the inner support 22 that is configured to engage a latch of the body 14 by the opening 34. The engagement between the striker 46 and the latch maintains the inner support 22 and outer panel 24 in the closed position until the latch is released by the operator of the vehicle, such as by an actuator near the driver's seat. The striker 46 may be made of steel, as one example. Alternatively or additionally, the baggage door 20 may include a lock or other anti-theft device.

The inner support 22 has a body 50 that includes the hinge portion 28, gooseneck portion 42, and an arm portion 52 extending away from the gooseneck portion 42 to an end portion 200. The body 50 includes one or more reinforcement members, such as ribs 60, 62, 64 and 66. The ribs 60, 62, 64, 66 are separated by recesses, such as channels 70, 72, 74. The ribs 60 are connected together at the end portion 200 by a raised connector portion 76. The ribs 60, 62, 64, 66 provide a crenulated cross-section of the inner support 22 which increases the rigidity of the inner support 22 throughout the inner support 22 including at the hinge portion 28. By improving the rigidity of the inner support 22, the connected inner support 22 and the hinge base 26 provide a rigid construct that resists loading in the downward direction 80 such as if an operator were to pull downward on the outer panel 24 when the baggage door 20 is opened.

Figure 3:
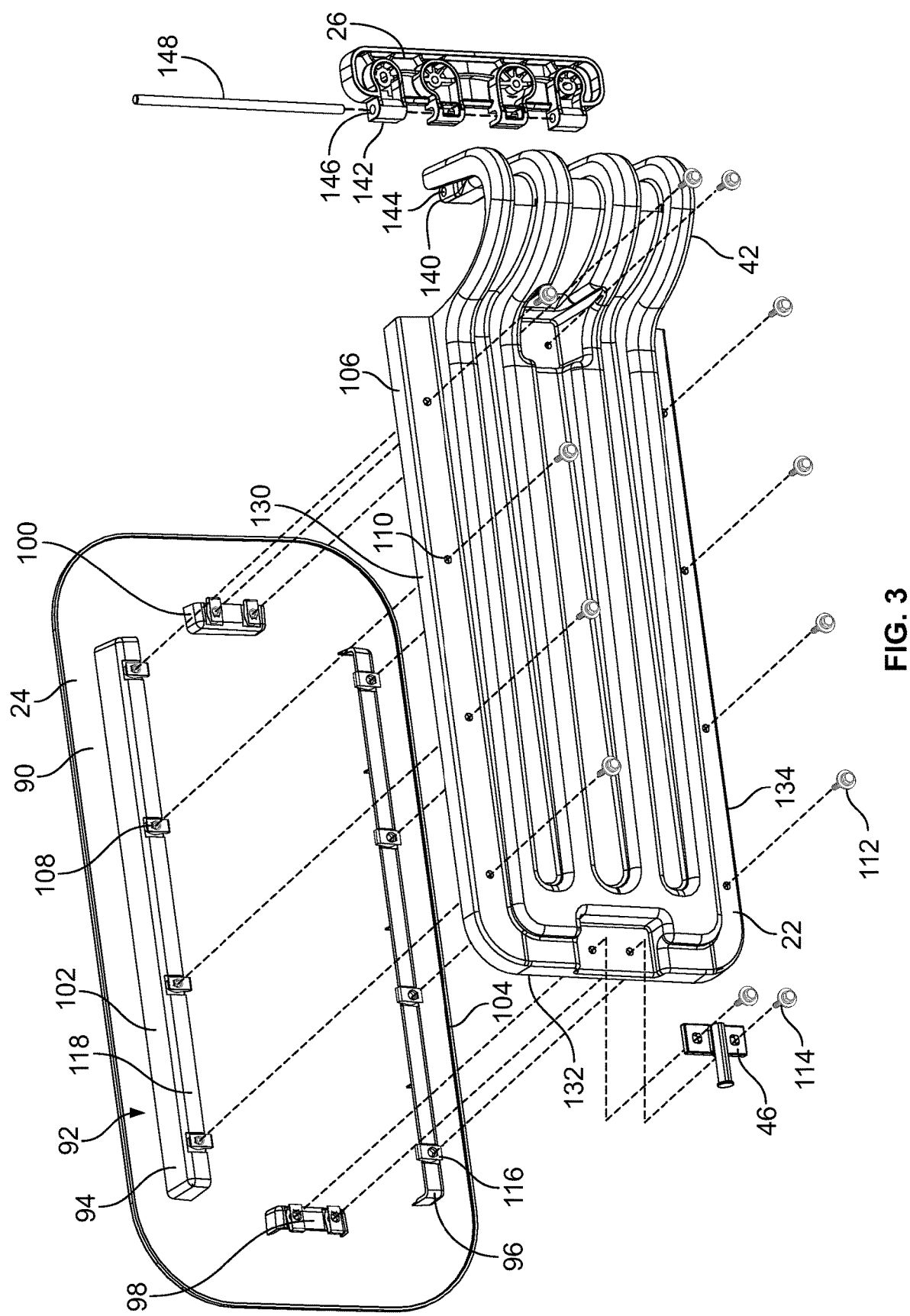
FIG. 3 is an exploded view of the baggage door of FIG. 2 showing an outer panel, an inner support, a hinge base, and a hinge pin of the baggage door.

With reference to FIG. 3, the outer panel 24 includes an inner surface 90 having one or more mounts 92, such as upper mounts and lower mounts 94, 96 and side mounts 98, 100, for connecting the outer panel 24 to the inner support 22. In one embodiment, the upper and lower mounts 94, 96 have upper and lower walls 102, 104 and the inner support 22 has a skirt portion 106 that fits over the mounts 92 and extends along the upper and lower walls 102, 104. In this manner, the upper and lower mounts 94, 96 nest within the inner support 22 and provide a firm connection between the outer panel 24 and the inner support 22. The mounts 92 include one or more openings 108 that are aligned with one or more openings 110 of the inner support 22 when the outer panel 24 is mounted to the inner support 22. The baggage door 20 includes one or more fasteners, such as screws 112, 114, for connecting the inner support 22, the outer panel 24, and the striker 46. In one embodiment, the baggage door 20 includes fastener receivers, such as U-nuts 116, that are positioned on inner walls 118 of the mounts 92. The U-nuts 116 have threads that receive threaded shanks of the screws 112, 114. The screws 112 and/or 114 may be, for example, M6×25 mm screws with hex heads and captive washers and the U-nuts 116 are M6 U-nuts. In another approach, the inner support 22 and the outer panel 24 may be connected using a heat staking operation.

Regarding FIGS. 2 and 3, the skirt portion 106 of the inner support 22 includes upper skirt portion 130, side skirt portion 132, and a lower skirt portion 134. The skirt portions 130, 132, 134 form a C-shape that mates with the generally C-shaped arrangement of the upper mount 94, side mount 98, and lower mount 96. This mating engagement forms a rigid construct of the outer panel 24 and inner support 22 that resists relative linear movement and relative turning therebetween.

With reference to FIG. 3, the hinge portion 28 of the inner support 22 includes one or more knuckles 140 that are laced with one or more knuckles 142 of the hinge base 26. The knuckles 140 include through openings 144 and the knuckles 142 include through openings 146 that are aligned with the through openings 144 with the knuckles 140 are laced with the knuckles 142. The hinge pin 148 extends through the through openings 144, 146 of the laced knuckles 140, 142. The hinge pin 148 and the knuckles 140, 142 together define the pivot access 30 about which the inner support 22 and outer panel 24 mounted thereto may pivot. The hinge pin 148 may be made of a metal, such as hardened steel.

Figure 4:
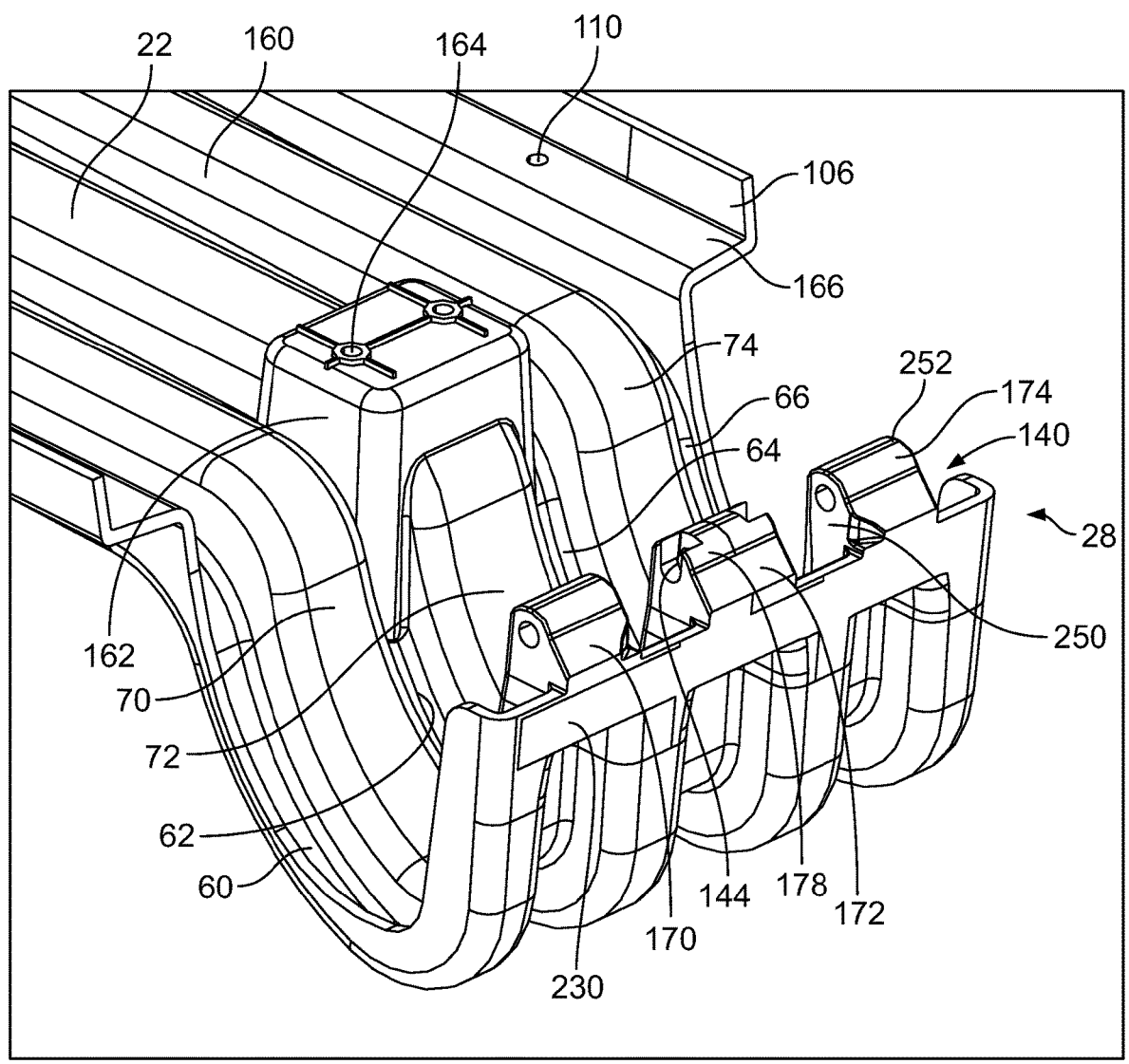
FIG. 4 is a perspective view of a hinge portion of the inner support of FIG. 3 showing protruding knuckles of the hinge portion that interlace with knuckles of the hinge base.

With reference to FIG. 4, the inner support 22 has an outer surface 160 and a receptacle 162 extending outwardly therefrom with openings 164 for receiving fasteners to connect the receptacle 162 to the side mount 100. The inner support 22 further includes a peripheral wall portion 166 extending laterally from the ribs 60, 66. The peripheral wall portion 166 includes the openings 110 that receive the screws 112.

The knuckles 140 of the inner support 22 include knuckles 170, 172, 174. The knuckles 170, 174 are substantially identical and near images of each other about a longitudinal center axis 176 (see FIG. 2) of the inner support 22. The knuckle 172 may be different than the knuckles 170, 174 to facilitate injection molding of the inner support 22. In one embodiment, the knuckle 172 includes a loop portion 178 that extends around the through opening 144 of the knuckle 172. Each of the knuckles 140 includes side wall portions 250, 252 that are in confronting relation with side wall portions 184, 186 (see FIG. 8) of the nearby knuckles 142.

Figure 5:
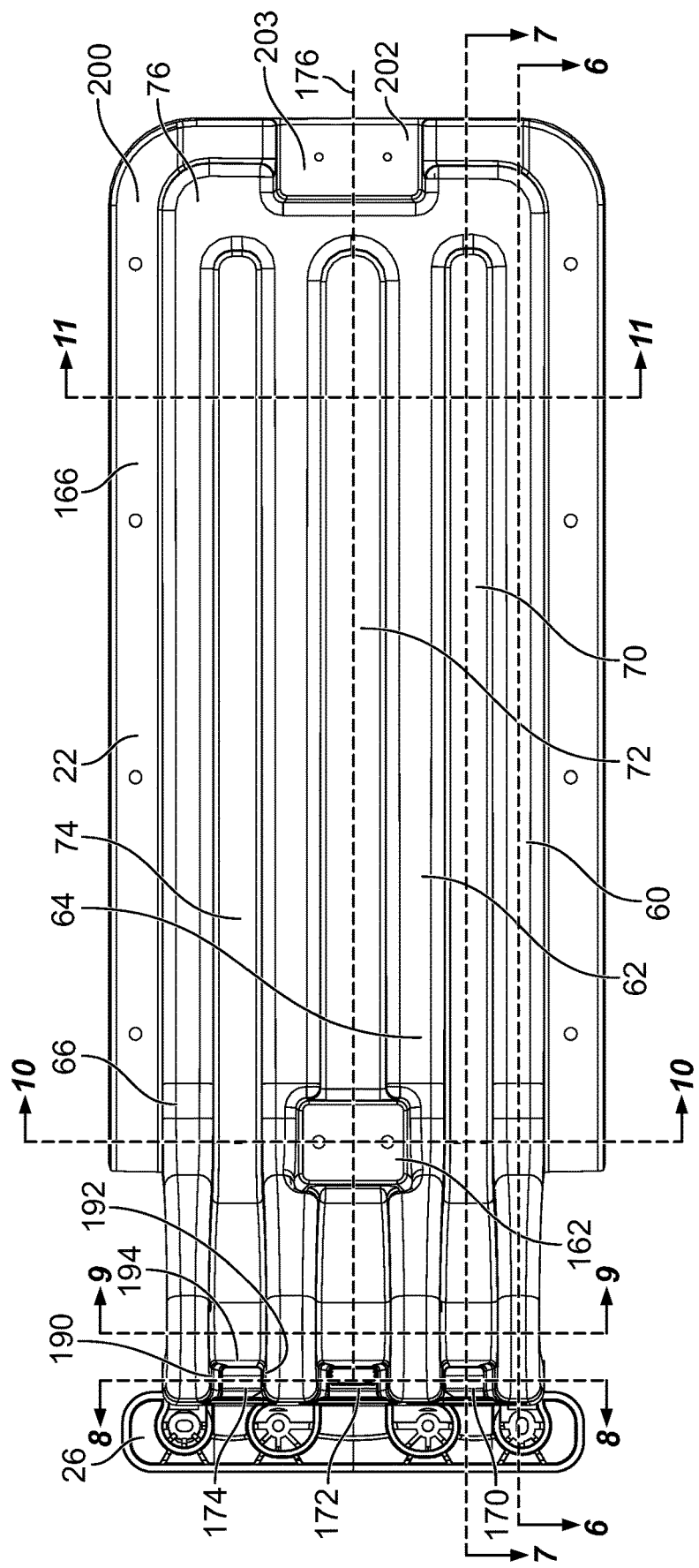
FIG. 5 is a plan view of the hinge base and the inner support of FIG. 3 showing elongate ribs of the inner support extending from the hinge portion of the inner support to an opposite end portion of the inner support.
Figure 16:
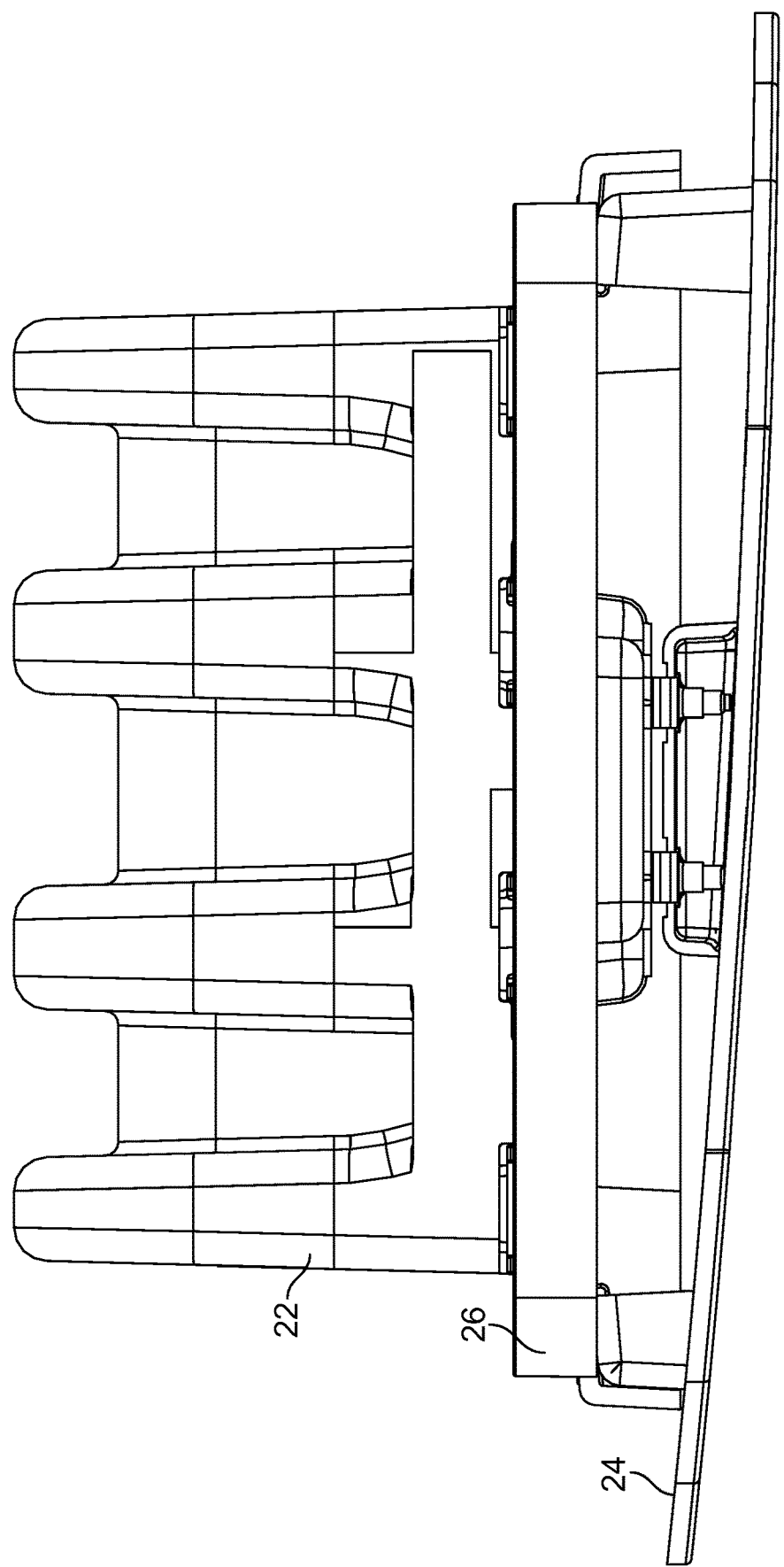
FIG. 16 is an end elevational view of the baggage door of FIG. 2.

With reference to FIGS. 2 and 5, the inner support 22, hinge base 26, and outer panel 24 have respective lines of symmetry that permit the components of the baggage door 20 to be assembled in a first configuration for a driver's side baggage door and a second configuration for a passenger's side baggage door. More specifically, the outer panel 24 may be curved and inclined as shown in FIG. 16 to compliment the exterior of the vehicle body 14. The outer panel 24 is symmetric about an axis 175 (see FIG. 2) and may be rotated 180 degrees about the axis 175 to cover either the driver's side or the passenger's side baggage door. Likewise, the hinge base 26 and the inner support 22 are symmetrical about the longitudinal axis 126. The hinge base 26 and the inner support 22 may be rotated 180 degrees about the axis 176 to be installed at either the driver's side or the passenger's side of the vehicle body 14. Thus, the major components of the baggage door 20 have a first plane of symmetry (along axis 175) for the outer panel 24 and a second plane of symmetry (along axis 176) for the inner support 22 and hinge base 26. The two planes of symmetry permit the baggage door 20 to be installed on either the driver's side or the passenger's side of the vehicle body 14.

The ribs 60, 62, 64, 66 extend longitudinally and are laterally offset from the knuckles 170, 172, 174 of the inner support 22. This configuration forms a generally U-shaped profile of the inner support 22 at the hinge portion 28 surrounding the knuckles 140 to increase the rigidity of the connection between the hinge base 26 and the inner support 22. More specifically, the rib 66 has a side wall portion 190, the rib 64 has a side wall portion 192, and the channel 74 includes an end wall portion 194. The side walls 190, 192 and end wall portion 194 extend down toward the knuckle 174 and form a rigid cross-sectional shape of the hinge portion 28. The ribs 60, 62, 64 form similar configurations at the knuckles 170, 172.

The ribs 60, 62, 64, 66 extend from the knuckles 170, 172, 174 toward the end portion 200 of the inner support 22 and provide rigidity throughout the inner support 22. The inner support 22 further includes a striker compartment 202 that is recessed relative to the raised connection portion 76. The striker compartment 202 provides a surface 203 for mounting the striker 46.

Figure 6:
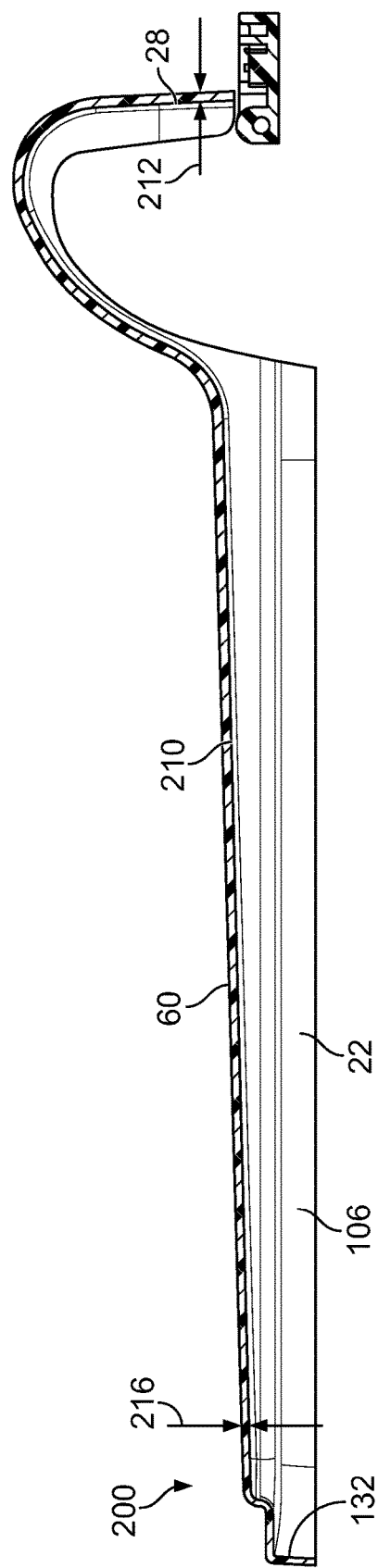
FIG. 6 is a cross-sectional view taken across line 6-6 in FIG. 5 showing a thickness of a wall of one of the ribs decreasing as the rib extends from the hinge portion to the opposite end portion of the inner support.

With reference to FIG. 6, the rib 60 of the inner support 22 includes a rib inner wall 210 that extends from the hinge portion 28 of the inner support 22 to the end portion 200. The rib inner wall 210 has a first thickness 212 at the hinge portion 28 and a thickness 216 at the end portion 200. The rib inner wall 210 may have a decreasing thickness from the hinge portion 28 to the end portion 200 such that the thickness 212 is greater than the thickness 216. The greater thickness 212 at the hinge portion 28 provides more material near the knuckles 140 and further increases the rigidity of the connection between the inner support 22 and the hinge base 26. The other ribs 62, 64, 66 have configurations similar to the rib 60.

Figure 7:
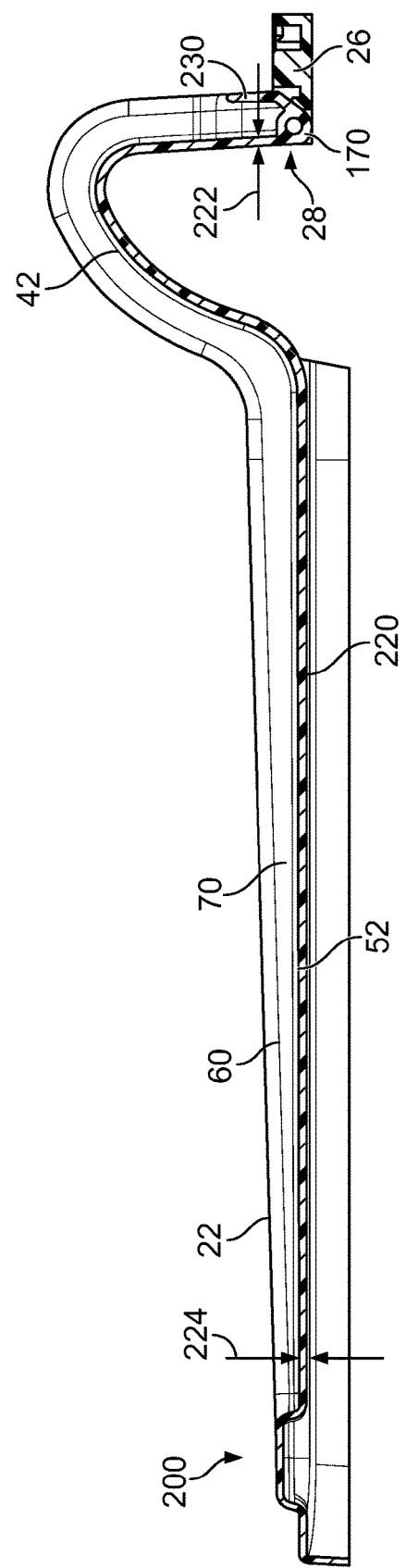
FIG. 7 is a cross-sectional view taken across line 7-7 in FIG. 5 showing a thickness of an outer floor of one of the channels of the inner support decreasing as the channel outer floor extends from the hinge portion to the opposite end portion of the inner support.

With reference to FIG. 7, the channel 70 of the inner support 22 includes an outer floor 220 having a thickness 222 at the hinge portion 28 and a thickness 224 at the end portion 200. The channel outer floor 220 extends away from the knuckle 170 toward the end portion 200 and decreases in thickness as the channel outer floor 220 extends through the gooseneck portion 42 and the arm portion 52 of the inner support 22. The thicker material of the channel outer floor 220 at the knuckle 170 increases the strength of the inner support 22.

Figure 15:
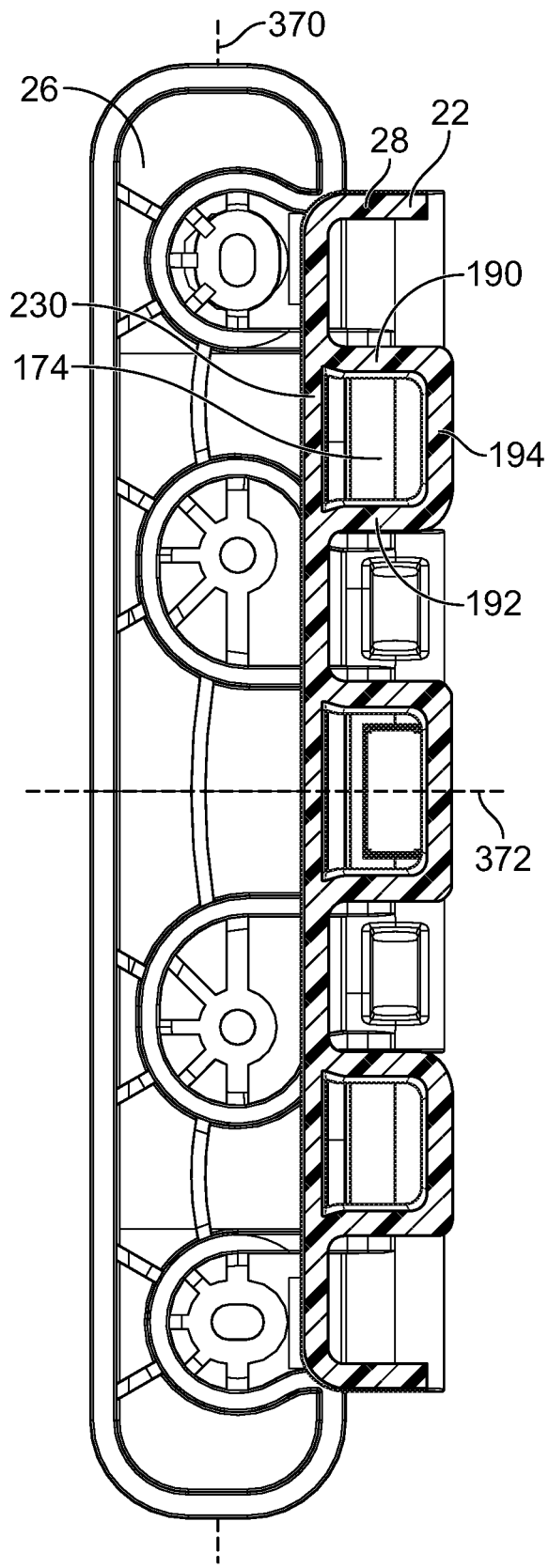
FIG. 15 is a cross-sectional view taken generally across line 15-15 in FIG. 2 showing a box-shaped configuration of the inner support adjacent each knuckle of the inner support.

Regarding FIGS. 7 and 15, the hinge portion 28 of the inner support 22 includes webs 230 extending intermediate side wall portions 190, 192 of adjacent ribs 60, 62, 64, 66. The webs 230 further strengthen the hinge portion 28 of the inner support 22 and form a box-shaped section of the hinge portion 28 near the knuckles 140, such as near the knuckle 174.

Figure 8:
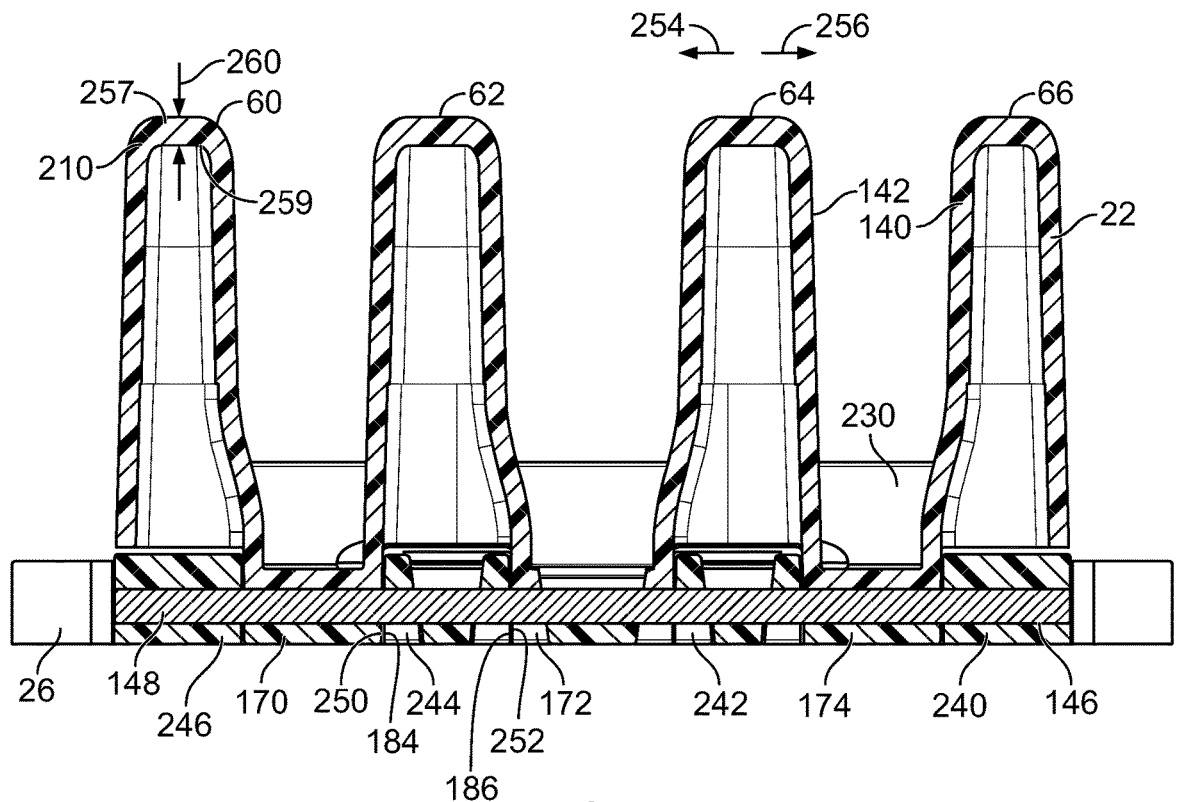
FIG. 8 is a cross-sectional view taken across line 8-8 in FIG. 5 showing the knuckles of the inner support laced with the knuckles of the hinge base and the hinge pin extending in through openings of the laced knuckles.
Figure 12:
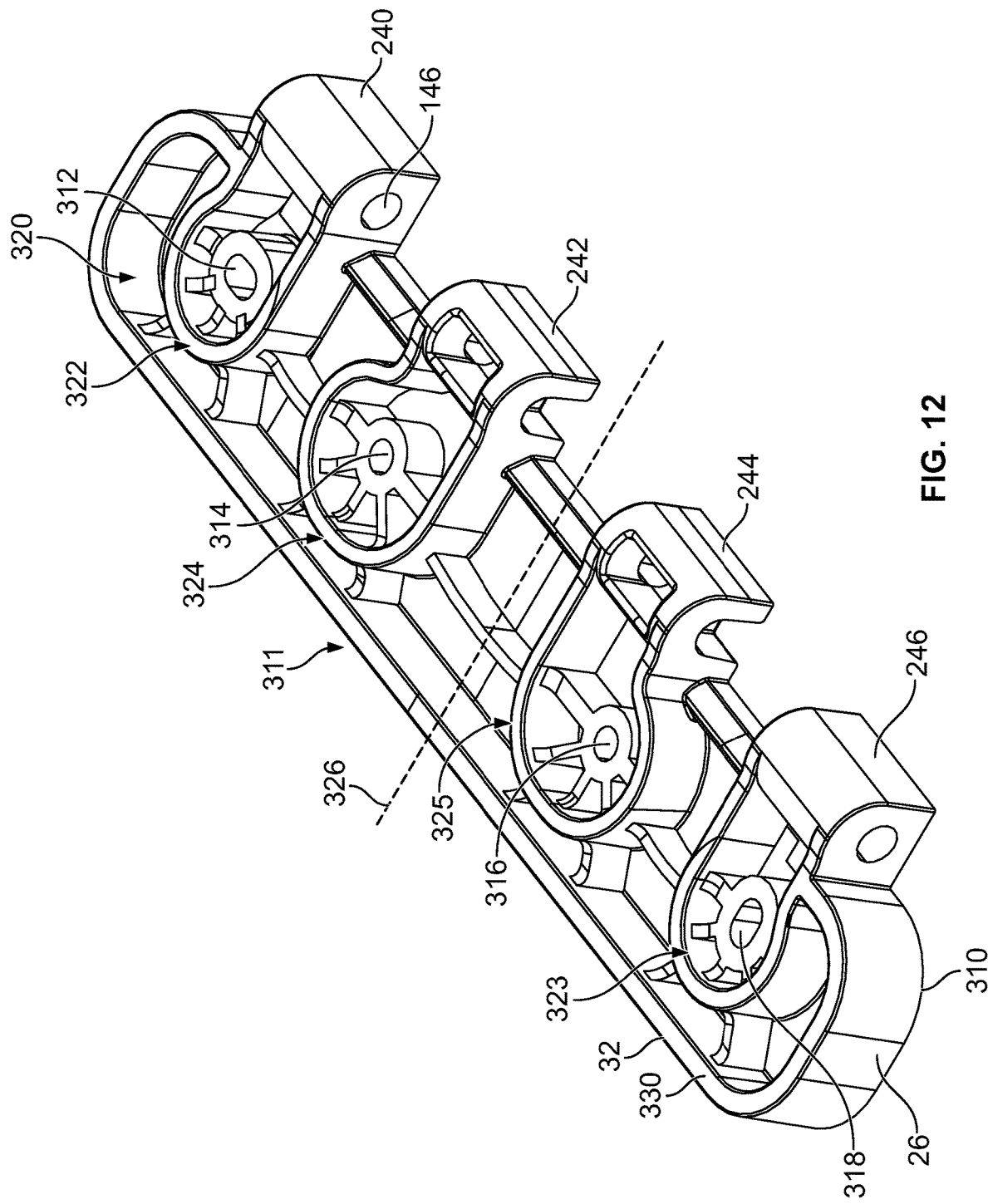
FIG. 12 is a perspective view of the hinge base of FIG. 3 showing through openings of the hinge base that receive fasteners for mounting the hinge base to a surface near a baggage door opening of a body of the commercial vehicle of FIG. 1.

With reference to FIGS. 8 and 12, the knuckles 142 of the hinge base 26 include knuckles 240, 242, 244, 246 having the through openings 146 formed therein for receiving the hinge pin 148. When the knuckles 170, 172, 174 of the inner support 22 are laced with the knuckles 240, 242, 244, 246 of the hinge base 26, the knuckles 240, 242, 244, 246 have side wall portions 184, 186 that are in confronting relation with side wall portions 250, 252 of the adjacent knuckles 170, 172, 174. The confronting relation between the side wall portions of the laced knuckles 170, 172, 174 and 240, 242, 244, 246 transfers loading of the inner support 22 in either direction 254, 256 and maintains the outer panel 24 at the set vertical position thereof. The laced knuckles 170, 172, 174 and 240, 242, 244, 246 further resist a bending moment created at the connection between the inner support 22 and the hinge base 26 if a vertical, downward load is applied to the outer panel 24, such as if an operator pulls downwardly on the outer panel 24.

Regarding FIG. 8, the ribs 60, 62, 64, 66 have inner wall portions 210 with thicknesses 260 that are substantially the same at the gooseneck portion 42. The thickness 260 at each rib 60, 62, 64, 66 is defined between an inner surface 257 and an outer surface 259 of the inner support 22. The thicknesses 260 increase as the ribs 60, 62, 64, 66 extend toward the knuckles 170, 172, 174 and decrease as the ribs 60, 62, 64, 66 extend toward the end portion 200.

Figure 9:
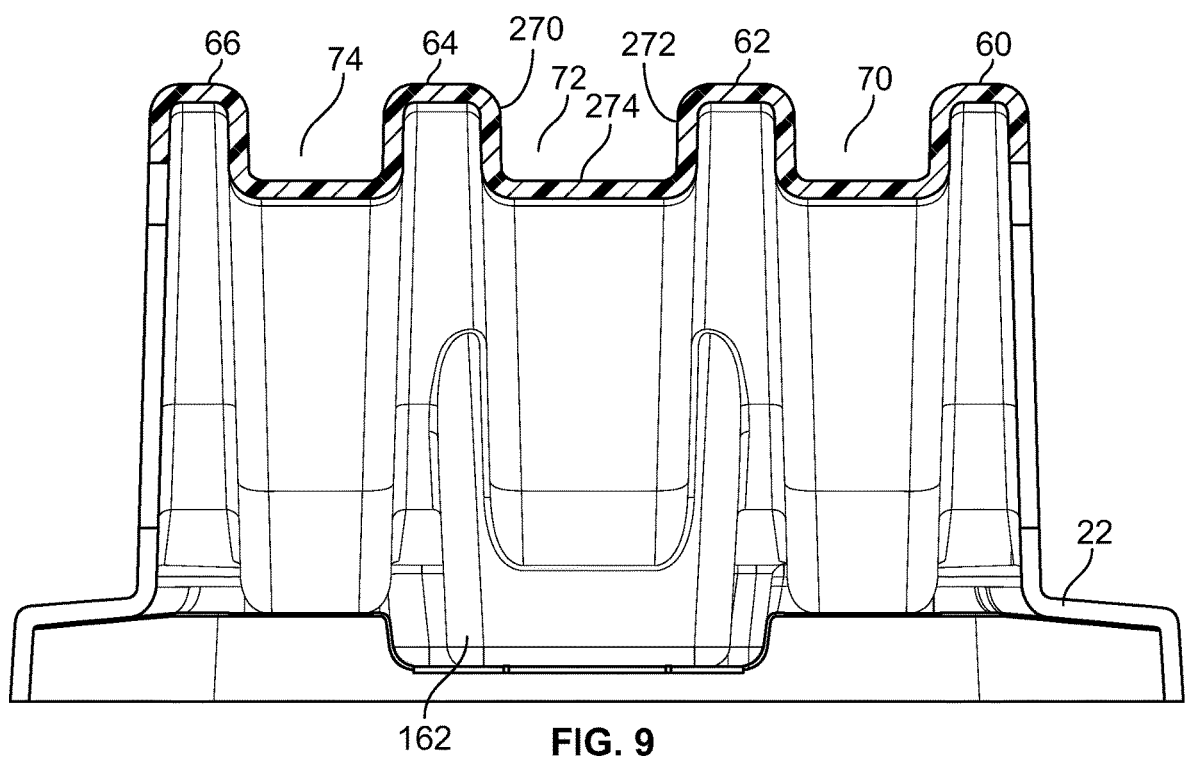
FIG. 9 is a cross-sectional view taken across line 9-9 in FIG. 5 showing a cross section of the inner support at a gooseneck portion of the inner support.
Figure 10:
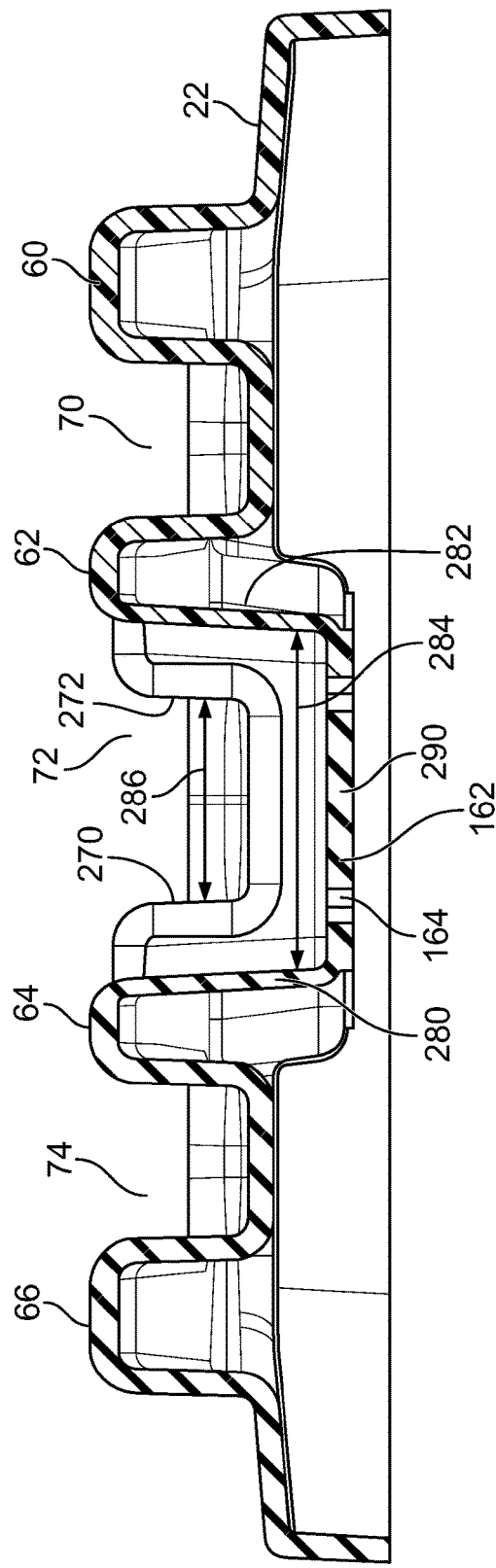
FIG. 10 is a cross-sectional view taken across line 10-10 of FIG. 5 showing the ribs and channels of the inner support intermediate the gooseneck portion and the end portion of the inner support.

With reference to FIG. 9, the ribs 64, 62 have side wall portions 270, 272 and the channel 72 has an outer floor 274 extending therebetween. As the ribs 62, 64 and channel 72 extend from the gooseneck portion 42 toward the end portion 200, the ribs 62, 64 narrow near the compartment 162. Regarding FIG. 10, the compartment 162 includes side wall portions 280, 282 that are separated by a distance 284 and the side wall portions 270, 272 aft of the compartment 162 are separated by a distance 286 that is less than distance 284. The compartment 162 includes a floor portion 290 having the openings 164 that receive screws for connecting the compartment 162 to the side mount 100. The floor portion 290 provides a wide, flat surface to transfer loading from the side mount 100 to the inner support 122.

Figure 11:
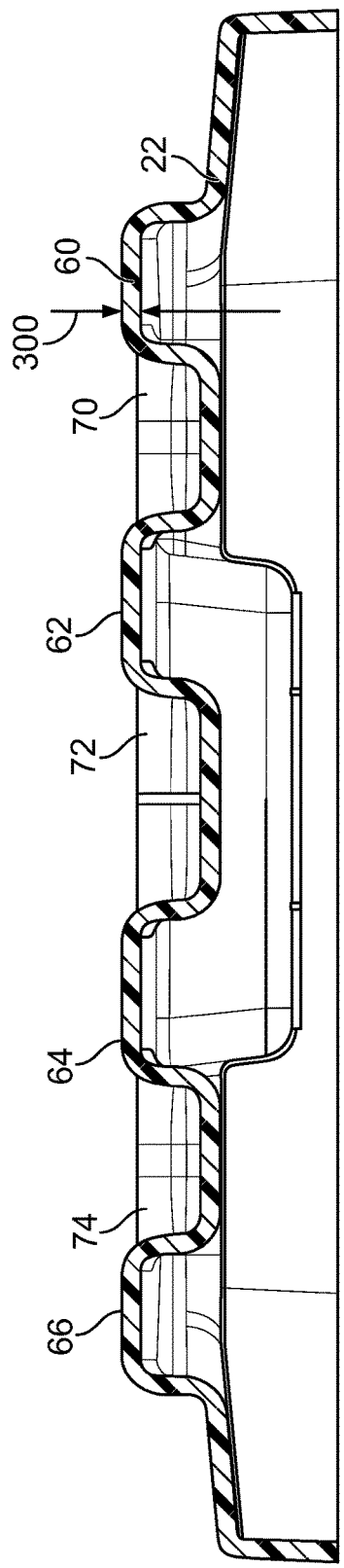
FIG. 11 is a cross-sectional view taken across line 11-11 in FIG. 5 showing the thickness of the end portion of the inner support being less than at the gooseneck portion of FIG. 9.

With reference to FIG. 11, the ribs 60, 62, 64, 66 each have a thickness 300 near the end portion 200 that is less than the thickness 260 of the ribs 60, 62, 64, 66 at the gooseneck portion 42. The decreasing thickness of the ribs 60, 62, 64, 66 reduces the weight of the inner support 22.

Turning to FIG. 12, the hinge base 26 includes a body 311 having the inner surface 32 for being positioned against a surface near the baggage door opening 34 and an outer surface 310 opposite the inner surface 310. The hinge base 26 includes pockets 320 with through openings 312, 314, 316, 318. The pockets 320 include end pockets 322, 323 and center pockets 324, 325 on opposite sides of an axis 326 of symmetry of the hinge base 26. The pockets 322, 324 are mirror images of the pockets 323, 325 about the axis 326. The pockets 320 provide reinforcement for the hinge base 26 about the through openings 312, 314, 316, 318 to resist crack propagation throughout the hinge base 26. Further, the hinge base 26 includes an outer wall or return flange 330 extending around a periphery of the hinge base 26 to provide further rigidity and resistance to crack propagation.

Figure 13:
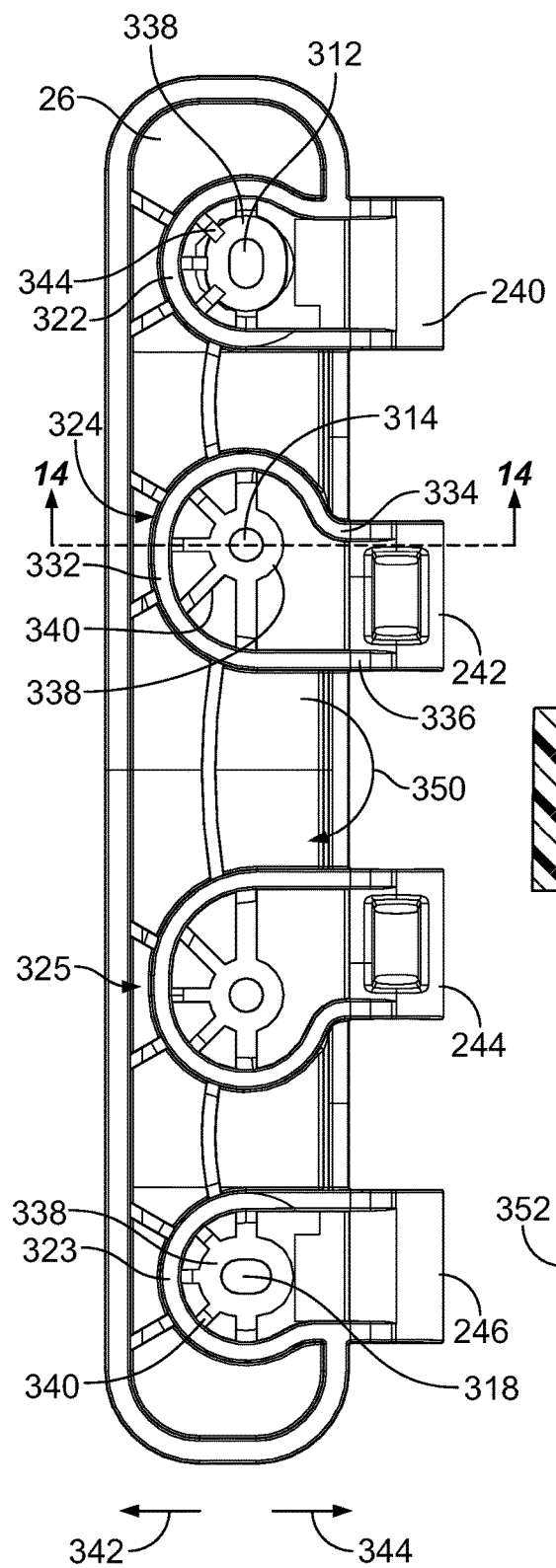
FIG. 13 is a plan view of the hinge base of FIG. 12 showing pockets of the hinge base about the through openings of the hinge base.

Regarding FIG. 13, each pocket 322, 323, 324, 325 has a pocket perimeter wall 332 including straight portions 334, 336 that extend to the respective knuckle 240, 242, 244, 246. Each pocket 320 further includes a hub wall 338 extending about the associated through opening, e.g. through opening 314, and webs or radial walls, such as radial walls 340, extending outwardly from the hub wall 338 to the pocket perimeter wall 332. The radial walls 340 brace the hub wall 338 against forces acting on the hub wall 338 in radial directions such as directions 342, 344.

For example, if the hinge base 26 is mounted as shown in FIG. 13 with the through opening 312 vertically above the through opening 318, the hinge base 26 may be subjected to a moment acting into the page in FIG. 13 when a load is applied in a downward direction 352 near the end portion 200 of the inner support 22, such as by an operator pulling downward on the outer panel 24 when the outer panel 24 is partially open. The load in direction 352 also causes reaction forces at the mounting bolts into and out of the page of FIG. 13.

The load in direction 352 on the inner support 22 is transferred from the inner support 22 to the hinge base 26 via the laced knuckles 170, 172, 174 and 240, 242, 244, 246 and hinge pin 148. The body 311 of the hinge base 26 urges the pocket perimeter wall 332 of the pocket 322 in direction 344 which places some of the radial walls 340 of the pocket 322 in compression between the pocket perimeter wall 332 and the hub wall 338 of the pocket 322. The hub wall 338 presses in direction 344 against the fastener received in through opening 312.

Conversely, the load in direction 352 on the inner support 22 causes the body 311 of the hinge base 26 to urge the perimeter wall 332 of the pocket 323 in direction 342. This places some of the radial walls 340 of the pocket 323 in tension between the perimeter wall 332 and the hub wall 338 of the pocket 323. The hub wall 338 presses in direction 342 against the fastener received in the through opening 318. The pockets 322, 323, 324, 325 thereby transfer loading from the inner support 22 to the fasteners securing the hinge base 26 to the body 14 of the truck 12. Further, the pocket perimeter wall 332, hub wall 338, and radial walls 340 of each pocket 322, 323, 324, 325 create a non-planar geometry of the hinge base 26 around the through openings 312, 314, 316, 318 that inhibits crack propagation through the hinge base 26.

Figure 14:
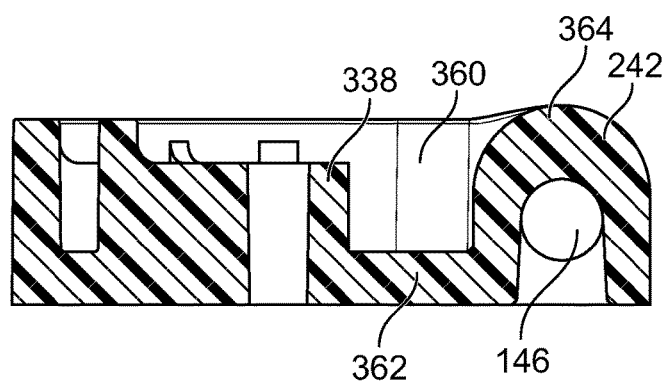
FIG. 14 is a cross-sectional view taken across line 14-14 in FIG. 13 showing one of the pockets of the hinge base and a loop portion of the associated knuckle of the hinge base.

With reference to FIG. 14, the pockets 320 include cavities 360 formed between the pocket perimeter wall 332, hub wall 338, and a floor 362 of the pocket 320. The floor 362 is contiguous with a loop portion 364 of the knuckle 242 and cradles the hinge pin 148 when the hinge pin is received in the through opening 146 of the knuckle 242.

Regarding FIG. 15, the hinge base 26 has a longitudinal axis 370 and an axis of symmetry 372. The symmetry of the hinge base 26 permits the hinge base 26 to be flipped to install the baggage door 20 on either the driver's side or the passenger's side of the vehicle body 20 as discussed above.

Figure 17:
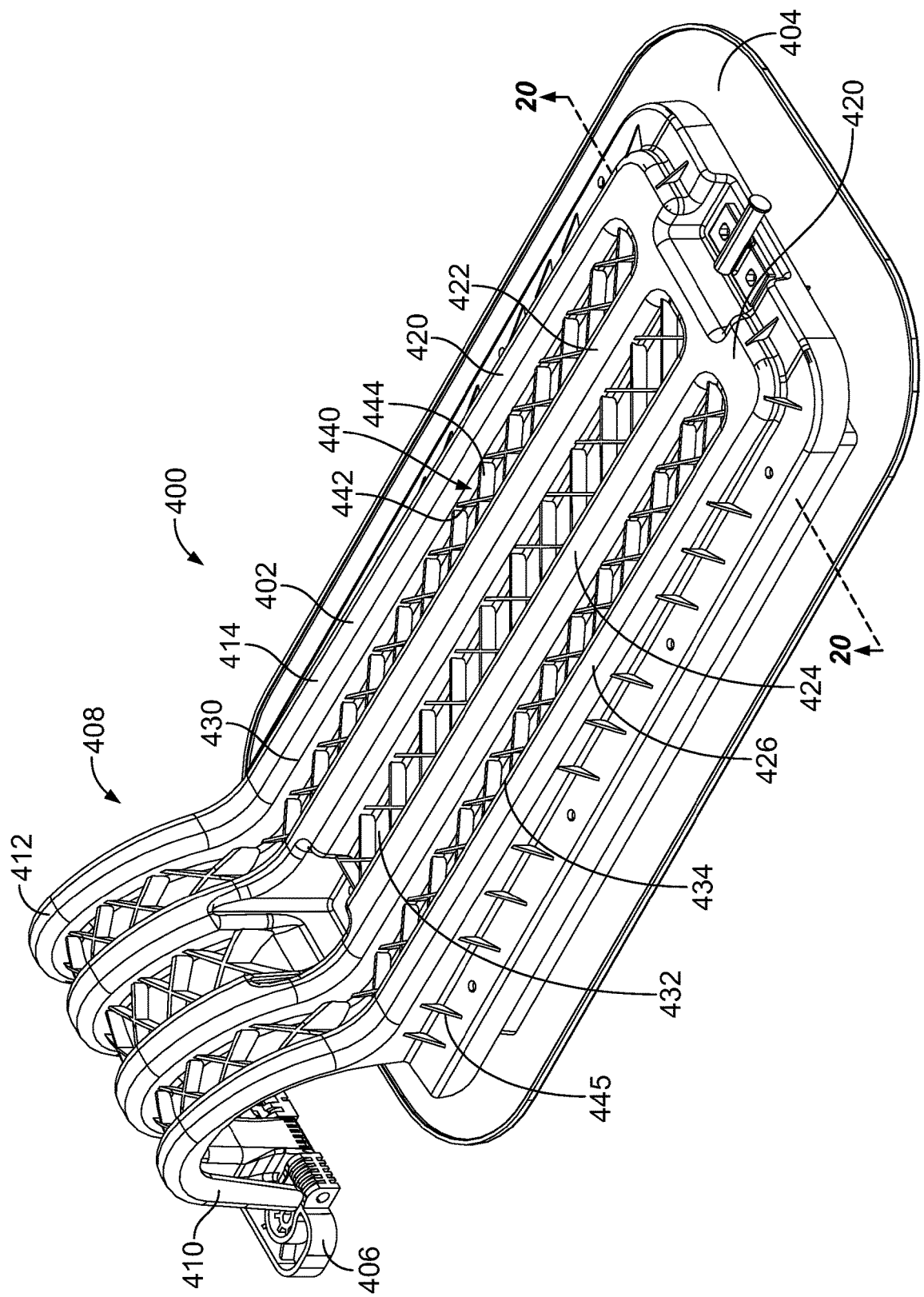
FIG. 17 is a perspective view of a baggage door having an outer panel, an inner support, and a hinge base.
Figure 18:
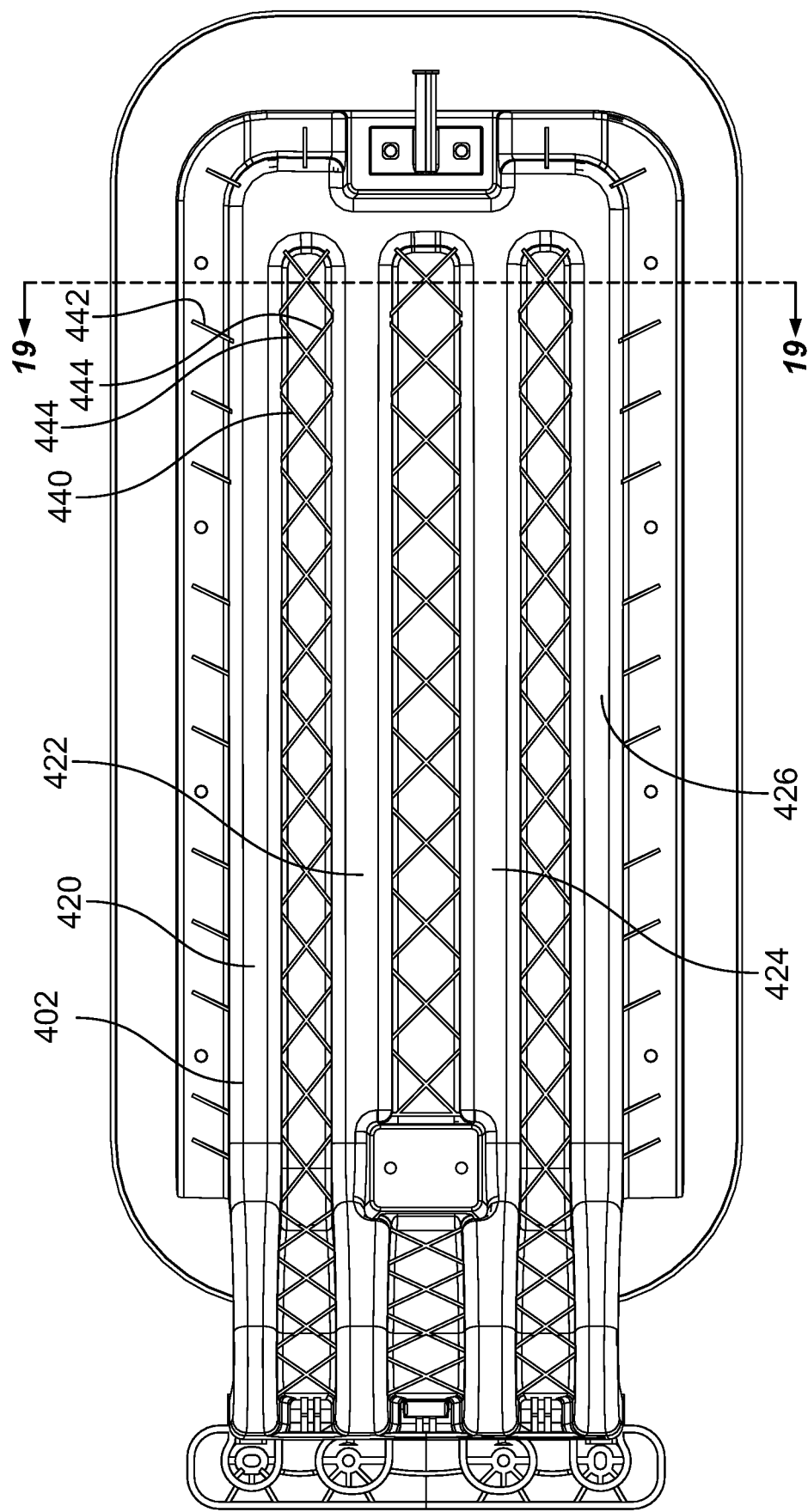
FIG. 18 is a top plan view of the baggage door of FIG. 17 showing ribs of the inner support extending longitudinally along the inner support and cross-bridging that extends laterally between the ribs to increase the rigidity of the inner support.

Regarding FIGS. 17 and 18, a baggage door 400 is provided that is similar in many respects to the baggage door discussed above such that differences will be highlighted. The baggage door 400 includes an inner support 402, an outer panel 404, and a hinge base 406. The inner support 402 includes a body 408 having a hinge portion 410, a gooseneck portion 412, and an arm portion 414. The body 408 includes longitudinal ribs 420, 422, 424, 426 extending substantially the entire length of the inner support 402. The inner support 402 includes channels 430, 432, 434 separating the ribs 420, 422, 424, 426. The inner support 400 includes rib supports, such as bridging, connecting the ribs 420, 422, 424, 426. In one embodiment, the bridging includes cross-bridging 440 including intersecting struts 442, 444 configured to resist relative movement of the ribs 420, 422, 424, 426. The cross-bridging 440 adds resistance to bending (such as an operating grasping the outer panel 404 as he falls), relative longitudinal movement of the ribs 420, 422, 424, 426, and twisting of the ribs 420, 422, 424, 426.

Figure 19:
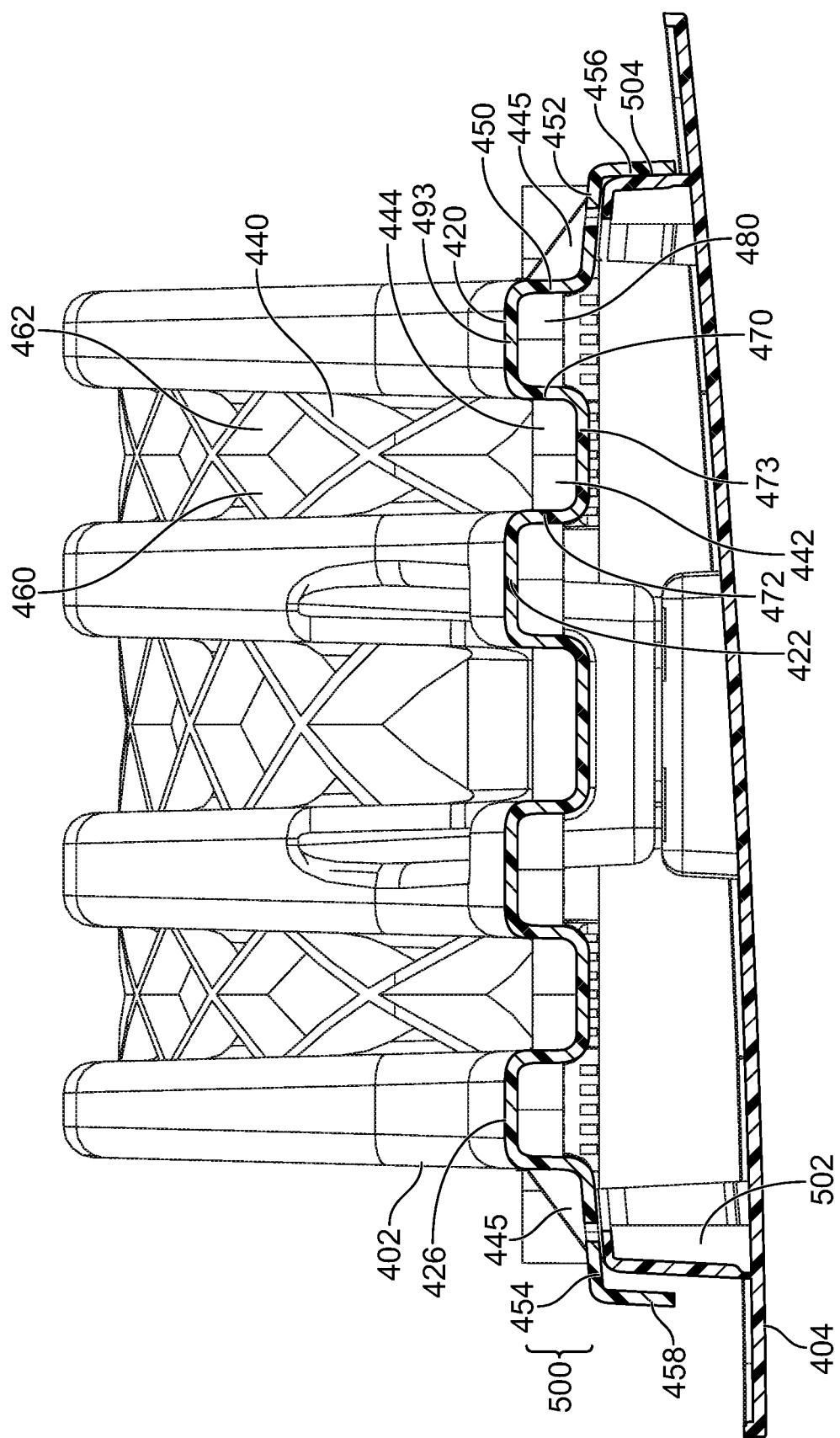
FIG. 19 is a cross-sectional view taken across line 19-19 in FIG. 18 showing struts of the cross-bridging extending between side walls of adjacent ribs.

Regarding FIG. 19, the inner support 402 also includes braces 445 extending between outer side wall portions 450 of the ribs 420, 426 and to wall portions 452, 454 from which skirt portions 456, 458 of the inner support 402 depend therefrom. The braces 445 resist bending of the wall portions 452, 454 relative to the ribs 420, 426. The outer panel 404 includes mounts 502, 504 that may be secured using fasteners to the wall portions 452, 454 of the inner support 402. The braces 445 increase the rigidity of the construct of the inner support 402 and outer panel 404.

Regarding FIG. 19, the cross-bridging 440 may extend through the gooseneck portion 412 into the hinge portion 410. The cross-bridging 440 may include larger struts 460, 462 with varying lengths, thicknesses, and curvatures to provide rigidity to the inner support 402 throughout the length of the inner support 402. The cross-bridging 440 and the struts 442, 444 interconnect side wall portions 450, 470 of adjacent ribs, such as ribs 420, 422. The struts 442, 444 may be upstanding from a floor portion 473 of the inner support 402 that extends between adjacent ribs 420, 422, 424, 426. The floor portion 743 and cross-bridging 440 create a rigid interconnection between the ribs 420, 422, 424, 426 while still permitting the inner support 402 to be have a unitary, one-piece construction, such as being formed by injection molding.

Figure 20:
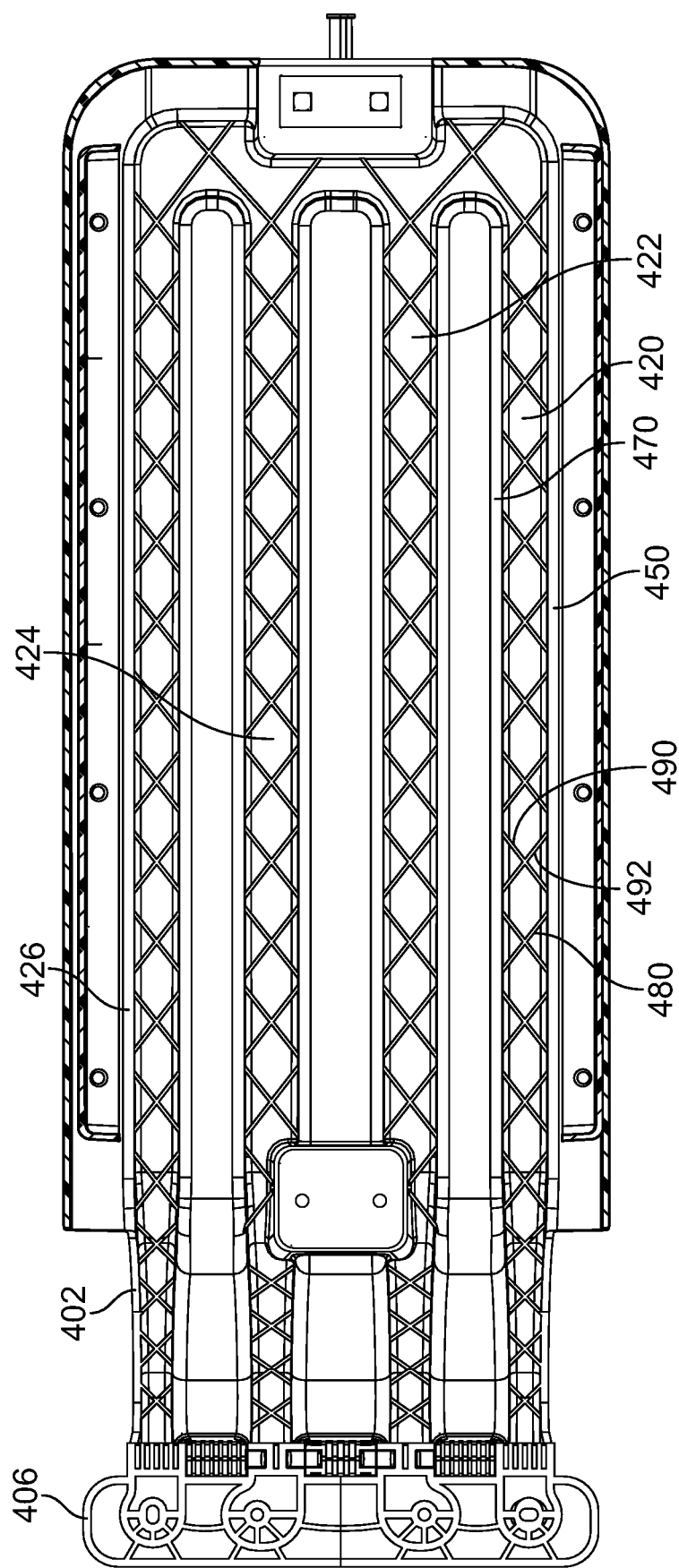
FIG. 20 is a cross-sectional view taken across line 20-20 in FIG. 17 showing the underside of the ribs of the inner support having internal cross-bridging to increase the rigidity of the inner support.

Regarding FIGS. 19 and 20, the ribs 420, 422, 424, 426 also include internal rib supports, such as bridging. In one embodiment, the bridging includes cross-bridging 480 having struts 490, 492 extending between the side wall portions 450, 470. The struts 490, 492 intersect and resist relative movement of the side wall portions 450, 470 of each of the ribs 420, 422, 424, 426. Each rib 420, 422, 424, 426 includes an upper wall portion 493 connecting side wall portions 450, 470 as shown in FIG. 19. The struts 490, 492 depend from the upper wall portion 493 and provide a rigid cross-section of the ribs 420, 422, 424, 426 while permitting the inner support 402 to have a unitary, one-piece construction such as being formed by injection molding.

Regarding FIG. 19, the cross-bridging 440 between the ribs 420, 422, 424, 426 and the cross-bridging 480 within the ribs 420, 422, 424, 426, in addition to the braces 445, forms a rigid plane 500 of the inner support 402. This rigid plane 500 increases the rigidity of the baggage door 400 while minimizing the material used to form the inner support 402. As shown in FIG. 19, the skirt portions 456, 458 of the inner support 402 extend along the mounts 502, 504 of the outer panel 404 and provide a rigid connection between the inner support 402 and the outer panel 404.

Uses of singular terms such as "a," "an," are intended to cover both the singular and the plural, unless otherwise indicated herein or clearly contradicted by context. The terms "comprising," "having," "including," and "containing" are to be construed as open-ended terms. It is intended that the phrase "at least one of" as used herein be interpreted in the disjunctive sense. For example, the phrase "at least one of A and B" is intended to encompass only A, only B, or both A and B.

While there have been illustrated and described particular embodiments of the present invention, it will be appreciated that numerous changes and modifications will occur to those skilled in the art, and it is intended for the present invention to cover all those changes and modifications which fall within the scope of the appended claims. For example, the hinge door 20 may be utilized with a recreational vehicle.

What is claimed is:

1. A baggage door for a vehicle, the baggage door comprising:
  a plastic outer panel for closing an opening of a body of a vehicle;
  a hinge base configured to be mounted to the vehicle body adjacent the opening;
  an elongate plastic inner support having opposite end portions;
  a hinge portion of one of the end portions of the plastic inner support, the hinge portion including at least one knuckle to pivotally connect to the hinge base;
  an arm portion of the plastic inner support extending away from the hinge portion to the other end portion of the plastic inner support for supporting the outer panel;
  longitudinal strengthening ribs of the plastic inner support extending from adjacent the at least one knuckle at the one end of the plastic inner support, through the arm portion, and to the other end portion of the plastic inner support;
  the longitudinal strengthening ribs each including a pair of side wall portions, a wall portion connecting the side wall portions, and an outer channel defined at least in part by the side wall portions and the wall portion;
  inner channels of the plastic inner support laterally separating the longitudinal strengthening ribs, the inner channels defined at least in part by the side wall portions of the longitudinal strengthening ribs; and
  wherein the inner support includes a gooseneck portion intermediate the hinge portion and the arm portion and the longitudinal strengthening ribs extend through the hinge portion, the gooseneck portion, and the arm portion.

2. The baggage door of claim 1 wherein the at least one knuckle of the inner support includes knuckles that are laterally offset from the longitudinal strengthening ribs.

3. The baggage door of claim 1 wherein the inner support is elongated along a longitudinal axis and has a cross-section perpendicular to the longitudinal axis, the cross-section having a crenulated shape.

4. The baggage door of claim 1 wherein the hinge base and the inner support are each made of a glass-filled polymer.

5. The baggage door of claim 1 wherein the hinge base is plastic; and
a metallic pin connects the inner support to the hinge base.

6. The baggage door of claim 1 wherein the inner support includes struts extending laterally between the longitudinal strengthening ribs.

7. The baggage door of claim 6 wherein
wherein each longitudinal strengthening rib includes struts connecting the side wall portions of the longitudinal strengthening rib.

8. The baggage door of claim 1 wherein the inner support includes intersecting struts extending laterally between the longitudinal strengthening ribs.

9. The baggage door of claim 8 wherein each longitudinal strengthening rib includes intersecting struts connecting the side wall portions of the longitudinal strengthening rib.

10. A baggage door for a vehicle, the baggage door comprising:
a plastic outer panel for closing an opening of a body of a vehicle;
a hinge base configured to be mounted to the vehicle body adjacent the opening;
an elongate plastic inner support having opposite end portions;
a hinge portion of one of the end portions of the plastic inner support, the hinge portion including at least one knuckle to pivotally connect to the hinge base;
an arm portion of the plastic inner support extending away from the hinge portion to the other end portion of the plastic inner support for supporting the outer panel;
longitudinal strengthening ribs of the plastic inner support extending from adjacent the at least one knuckle at the one end of the plastic inner support, through the arm portion, and to the other end portion of the plastic inner support;
the longitudinal strengthening ribs each including a pair of side wall portions, a wall portion connecting the side wall portions, and an outer channel defined at least in part by the side wall portions and the wall portion;
inner channels of the plastic inner support laterally separating the longitudinal strengthening ribs, the inner channels defined at least in part by the side wall portions of the longitudinal strengthening ribs;
wherein the at least one knuckle of the inner support includes knuckles that are laterally offset from the longitudinal strengthening ribs;
wherein the hinge portion of the inner support includes an end wall portion adjacent one of the knuckles of the hinge portion;
wherein the longitudinal strengthening ribs include two longitudinal strengthening ribs, with one of the two longitudinal strengthening ribs including a first side wall portion of the side wall portions and the other of the two strengthening ribs including a second side wall portion of the side wall portions spaced from the first side wall portion by the end wall portion; and
wherein the hinge portion of the inner support includes a web extending intermediate the first and second side wall portions and spaced from the end wall portion to form a box-shaped section of the hinge portion adjacent the one knuckle.

11. A baggage door for a vehicle, the baggage door comprising:
a plastic outer panel for closing an opening of a body of a vehicle;
a hinge base configured to be mounted to the vehicle body adjacent the opening;
an elongate plastic inner support having opposite end portions;
a hinge portion of one of the end portions of the plastic inner support, the hinge portion including at least one knuckle to pivotally connect to the hinge base;
an arm portion of the plastic inner support extending away from the hinge portion to the other end portion of the plastic inner support for supporting the outer panel;
longitudinal strengthening ribs of the plastic inner support extending from adjacent the at least one knuckle at the one end of the plastic inner support, through the arm portion, and to the other end portion of the plastic inner support;
the longitudinal strengthening ribs each including a pair of side wall portions, a wall portion connecting the side wall portions, and an outer channel defined at least in part by the side wall portions and the wall portion;
inner channels of the plastic inner support laterally separating the longitudinal strengthening ribs, the inner channels defined at least in part by the side wall portions of the longitudinal strengthening ribs; and
wherein the inner support includes an inner surface, an outer surface, and a thickness between the inner surface and the outer surface that decreases as the inner support extends from the hinge portion to the arm portion.

12. A baggage door for a vehicle, the baggage door comprising:
a plastic outer panel for closing an opening of a body of a vehicle;
a hinge base configured to be mounted to the vehicle body adjacent the opening;
an elongate plastic inner support having opposite end portions;
a hinge portion of one of the end portions of the plastic inner support, the hinge portion including at least one knuckle to pivotally connect to the hinge base;
an arm portion of the plastic inner support extending away from the hinge portion to the other end portion of the plastic inner support for supporting the outer panel;
longitudinal strengthening ribs of the plastic inner support extending from adjacent the at least one knuckle at the one end of the plastic inner support, through the arm portion, and to the other end portion of the plastic inner support;
the longitudinal strengthening ribs each including a pair of side wall portions, a wall portion connecting the side wall portions, and an outer channel defined at least in part by the side wall portions and the wall portion;
inner channels of the plastic inner support laterally separating the longitudinal strengthening ribs, the inner channels defined at least in part by the side wall portions of the longitudinal strengthening ribs;
wherein the plastic outer panel, plastic inner support, and hinge base are each elongated along a respective longitudinal axis; and
wherein the plastic outer panel has an axis of symmetry perpendicular to the plastic outer panel longitudinal axis, the inner support has an axis of symmetry parallel to the inner support longitudinal axis, and the hinge base has an axis of symmetry perpendicular to the hinge base longitudinal axis.

13. A baggage door for a vehicle, the baggage door comprising:
a plastic outer panel for closing an opening of a body of a vehicle;
a hinge base configured to be mounted to the vehicle body adjacent the opening;

an elongate plastic inner support having opposite end portions;

a hinge portion of one of the end portions of the plastic inner support, the hinge portion including at least one knuckle to pivotally connect to the hinge base;

an arm portion of the plastic inner support extending away from the hinge portion to the other end portion of the plastic inner support for supporting the outer panel;

longitudinal strengthening ribs of the plastic inner support extending from adjacent the at least one knuckle at the one end of the plastic inner support, through the arm portion, and to the other end portion of the plastic inner support;

the longitudinal strengthening ribs each including a pair of side wall portions, a wall portion connecting the side wall portions, and an outer channel defined at least in part by the side wall portions and the wall portion;

inner channels of the plastic inner support laterally separating the longitudinal strengthening ribs, the inner channels defined at least in part by the side wall portions of the longitudinal strengthening ribs;

wherein the hinge base includes:

a plurality of through openings for receiving fasteners;

a plurality of raised walls, each raised wall extending about one of the through openings; and a return flange extending around a periphery of the hinge base.

14. A baggage door for a vehicle, the baggage door comprising:

a plastic outer panel for closing an opening of a body of a vehicle;

a hinge base configured to be mounted to the vehicle body adjacent the opening;

an elongate plastic inner support having opposite end portions;

a hinge portion of one of the end portions of the plastic inner support, the hinge portion including at least one knuckle to pivotally connect to the hinge base;

an arm portion of the plastic inner support extending away from the hinge portion to the other end portion of the plastic inner support for supporting the outer panel;

longitudinal strengthening ribs of the plastic inner support extending from adjacent the at least one knuckle at the one end of the plastic inner support, through the arm portion, and to the other end portion of the plastic inner support;

the longitudinal strengthening ribs each including a pair of side wall portions, a wall portion connecting the side wall portions, and an outer channel defined at least in part by the side wall portions and the wall portion;

inner channels of the plastic inner support laterally separating the longitudinal strengthening ribs, the inner channels defined at least in part by the side wall portions of the longitudinal strengthening ribs;

wherein the hinge base is made of a plastic and includes a plurality of pockets, each pocket including:

a through opening for receiving a fastener;

a hub wall extending around the through opening;

an outer wall extending about the hub wall; and a plurality of radial walls extending radially between the hub wall and the outer wall.

15. A vehicle comprising:

a plurality of wheels;

a body connected to the wheels;

a through opening of the body;

a baggage door comprising:

a plastic outer panel for closing the through opening of the body;

a hinge base configured to be mounted to the body adjacent the opening;

an elongate plastic inner support having opposite end portions;

a hinge portion of one of the end portions of the plastic inner support, the hinge portion including at least one knuckle to pivotally connect to the hinge base;

an arm portion of the plastic inner support extending away from the hinge portion to the other end portion of the plastic inner support for supporting the outer panel;

longitudinal strengthening ribs of the plastic inner support extending from adjacent the at least one knuckle at the one end portion of the plastic inner support, through the arm portion, and to the other end portion of the plastic inner support;

the longitudinal strengthening ribs each including a pair of side wall portions, a wall portion connecting the side wall portions, and an outer channel defined at least in part by the side wall portions and the wall portion;

inner channels of the plastic inner support laterally separating the longitudinal strengthening ribs, the inner channels defined at least in part by the side wall portions of the longitudinal strengthening ribs; and wherein the inner support includes a gooseneck portion intermediate the hinge portion and the arm portion and the longitudinal strengthening ribs extend through the hinge portion, the gooseneck portion, and the arm portion.

16. The vehicle of claim 15 wherein the at least one knuckle of the inner support includes knuckles laterally offset from the longitudinal strengthening ribs.

17. The vehicle of claim 15 wherein the inner support is elongated along a longitudinal axis and has a cross-section perpendicular to the longitudinal axis, the cross-section having a crenulated shape.

18. The vehicle of claim 15 wherein the hinge base is plastic and the baggage door includes a metallic hinge pin connecting the inner support and the hinge base.

19. A method of assembling a vehicle baggage door comprising a plastic hinge base and an elongate plastic inner support, the plastic inner support comprising:

opposite end portions and a hinge portion of one of the end portions, the hinge portion including at least one knuckle;

an arm portion extending away from the hinge portion to the other end portion of the plastic inner support for supporting the outer panel;

longitudinal strengthening ribs extending from adjacent the at least one knuckle at the one end of the plastic inner support, through the arm portion, and to the other end portion of the plastic inner support;

the longitudinal strengthening ribs each including a pair of side wall portions, a wall portion connecting the side wall portions, and an outer channel defined at least in part by the side wall portions and the wall portion; and inner channels laterally separating the longitudinal strengthening ribs, the inner channels defined at least in part by the side wall portions of the longitudinal strengthening ribs; and wherein the inner support includes a gooseneck portion intermediate the hinge portion and the arm portion and the longitudinal strengthening ribs extend through the hinge portion, the gooseneck portion, and the arm portion, the method comprising:

mounting the plastic hinge base to a body of a vehicle adjacent a through opening of the body;

lacing knuckles of the elongate plastic inner support and the plastic hinge base;

advancing a metallic hinge pin through openings of the laced knuckles to pivotally connect the plastic inner support and the plastic hinge base; and mounting a plastic outer panel to the inner support.

20. The method of claim 19 wherein mounting the plastic outer panel to the plastic inner support includes nesting a skirt portion of the plastic inner support with at least one mount of the plastic outer panel.

21. The method of claim 19 wherein the plastic inner support is made of a glass-filled polymer and the plastic hinge base is made of a glass-filled polymer.

22. A baggage door for a vehicle, the baggage door comprising:

a plastic outer panel for closing an opening of a body of a vehicle;

a hinge base configured to be mounted to the vehicle body adjacent the opening;

an elongate plastic inner support having opposite end portions;

a hinge portion of one of the end portions of the plastic inner support, the hinge portion including at least one knuckle to pivotally connect to the hinge base;

an arm portion of the plastic inner support extending away from the hinge portion to the other end portion of the plastic inner support for supporting the outer panel;

longitudinal strengthening ribs of the plastic inner support extending from adjacent the at least one knuckle at the one end of the plastic inner support, through the arm portion, and to the other end portion of the plastic inner support;

the longitudinal strengthening ribs each including a pair of side wall portions, a wall portion connecting the side wall portions, and an outer channel defined at least in part by the side wall portions and the wall portion;

inner channels of the plastic inner support laterally separating the longitudinal strengthening ribs, the inner channels defined at least in part by the side wall portions of the longitudinal strengthening ribs;

wherein the wall portion of at least one of the longitudinal strengthening ribs includes an inner surface, an outer surface, and a thickness therebetween; and wherein the wall portion of the at least one of the longitudinal strengthening ribs has a first thickness adjacent the one end portion of the plastic inner support and a second thickness adjacent the other end portion of the plastic inner support that is less than the first thickness.

23. A baggage door for a vehicle, the baggage door comprising:

a plastic outer panel for closing an opening of a body of a vehicle;

a hinge base configured to be mounted to the vehicle body adjacent the opening;

an elongate plastic inner support having opposite end portions;

a hinge portion of one of the end portions of the plastic inner support, the hinge portion including at least one knuckle to pivotally connect to the hinge base;

an arm portion of the plastic inner support extending away from the hinge portion to the other end portion of the plastic inner support for supporting the outer panel;

longitudinal strengthening ribs of the plastic inner support extending from adjacent the at least one knuckle at the one end of the plastic inner support, through the arm portion, and to the other end portion of the plastic inner support;

the longitudinal strengthening ribs each including a pair of side wall portions, a wall portion connecting the side wall portions, and an outer channel defined at least in part by the side wall portions and the wall portion;

inner channels of the plastic inner support laterally separating the longitudinal strengthening ribs, the inner channels defined at least in part by the side wall portions of the longitudinal strengthening ribs; and wherein the outer channel of at least one of the longitudinal strengthening ribs has a first depth intermediate the end portions of the plastic inner support and a second depth adjacent the other end portion of the plastic inner support that is less than the first depth.

* * * * *